(12) United States Patent
Muck

(10) Patent No.: US 8,505,942 B2
(45) Date of Patent: Aug. 13, 2013

(54) ADJUSTABLE SPRING ASSEMBLY

(75) Inventor: Todd Rupert Muck, Fowlerville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 195 days.

(21) Appl. No.: 13/017,333

(22) Filed: Jan. 31, 2011

(65) Prior Publication Data
US 2012/0193887 A1  Aug. 2, 2012

(51) Int. Cl.
*B60G 11/46* (2006.01)

(52) U.S. Cl.
USPC ........ 280/124.174; 280/124.175; 280/124.17; 280/124.163; 280/124.165; 280/5.515; 267/31; 267/195; 267/227; 267/242

(58) Field of Classification Search
USPC ........... 280/5.515, 124.162, 124.163, 124.17, 280/124.174, 124.175, 124.104, 124.165, 280/124.171, 124.172, 124.173, 124.176; 267/31, 195, 227, 229, 241, 242, 260
See application file for complete search history.

(56) References Cited

U.S. PATENT DOCUMENTS

| | | | | |
|---|---|---|---|---|
| 1,199,019 A * | 9/1916 | Obrecht | ........................... | 267/45 |
| 1,229,109 A | 6/1917 | McIntyre | | |
| 1,640,778 A * | 8/1927 | Laher | ............................. | 267/45 |
| 1,934,892 A * | 11/1933 | Tea | ........................ | 280/124.104 |
| 1,946,357 A * | 2/1934 | Petrak | ............................ | 267/49 |
| 2,250,247 A * | 7/1941 | Ballamy et al. | ................. | 267/45 |
| 2,311,420 A * | 2/1943 | Ulrich | .................... | 280/124.108 |
| 2,732,220 A * | 1/1956 | Ward | ..................... | 280/124.176 |
| 3,083,034 A * | 3/1963 | Hollowell | ................... | 280/6.159 |
| 3,137,488 A * | 6/1964 | Toyer | ............................. | 267/269 |
| 3,173,668 A * | 3/1965 | Giovinazzo | ..................... | 267/45 |
| 3,231,258 A * | 1/1966 | Brownyer et al. | .............. | 267/31 |
| 3,481,451 A * | 12/1969 | Wickam | ........................ | 198/766 |
| 3,545,040 A * | 12/1970 | Mehnert | ....................... | 425/150 |
| 4,225,152 A * | 9/1980 | Eaton | ..................... | 280/124.163 |
| 4,397,478 A * | 8/1983 | Jensen et al. | ................. | 280/6.159 |
| 4,433,833 A * | 2/1984 | Tabe et al. | ..................... | 267/218 |
| 4,750,718 A | 6/1988 | Nickel | | |
| 4,867,474 A * | 9/1989 | Smith | ........................ | 280/5.507 |
| 4,982,972 A * | 1/1991 | Preston et al. | ................ | 280/6.16 |
| 5,129,633 A * | 7/1992 | Walton et al. | .................. | 267/45 |
| 5,137,300 A * | 8/1992 | Walton | ........................ | 280/5.503 |
| 5,172,930 A * | 12/1992 | Boye et al. | ................. | 280/6.157 |
| 5,566,928 A * | 10/1996 | Lee | ................................. | 267/31 |
| 6,220,580 B1 * | 4/2001 | Balczun | ............................ | 267/7 |
| 6,273,441 B1 * | 8/2001 | Neavitt et al. | .......... | 280/124.174 |
| 6,951,343 B2 * | 10/2005 | Hildebrand | ............ | 280/124.175 |
| 7,052,001 B2 | 5/2006 | Hitt et al. | | |
| 7,249,780 B1 * | 7/2007 | Wilson | ........................ | 280/676 |
| 7,537,226 B1 * | 5/2009 | Collazo | ................. | 280/124.175 |
| 2002/0096841 A1 * | 7/2002 | Hedenberg | ................. | 280/6.159 |
| 2003/0030236 A1 * | 2/2003 | Glass | ......................... | 280/5.514 |
| 2006/0213700 A1 * | 9/2006 | Hildebrand | ...................... | 180/9.1 |
| 2008/0129000 A1 * | 6/2008 | Munday et al. | ............ | 280/5.502 |
| 2009/0039611 A1 * | 2/2009 | Johns | ..................... | 280/124.175 |
| 2009/0045000 A1 * | 2/2009 | Brown | ........................ | 180/89.12 |
| 2009/0171526 A1 * | 7/2009 | Takenaka et al. | ............... | 701/29 |
| 2010/0301584 A1 * | 12/2010 | Pipe et al. | .................. | 280/418.1 |
| 2012/0211963 A1 * | 8/2012 | Muck | ..................... | 280/124.174 |

* cited by examiner

*Primary Examiner* — Drew Brown
*Assistant Examiner* — Barry Gooden, Jr.
(74) *Attorney, Agent, or Firm* — Gifford, Krass, Sprinkle, Anderson & Citkowski, P.C.

(57) ABSTRACT

A suspension device having a leaf spring and a piston-cylinder unit. The leaf spring has a first end that is movably attached to a frame and a second end pivotally attached to the piston-cylinder unit. In addition, the piston-cylinder unit is pivotally attached to the frame.

19 Claims, 2 Drawing Sheets

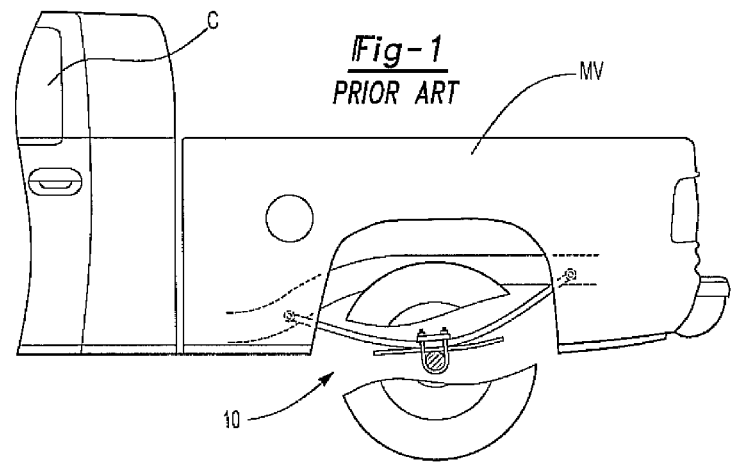
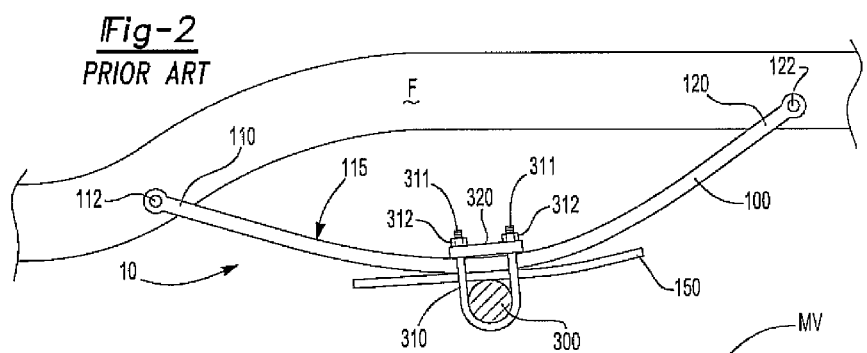
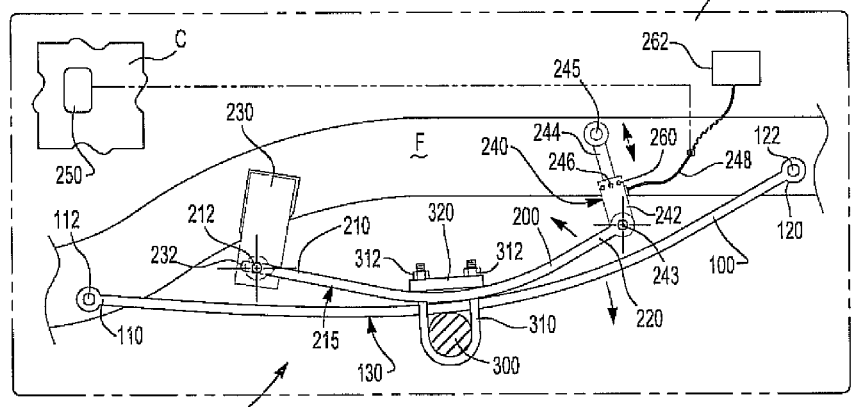

ADJUSTABLE SPRING ASSEMBLY

FIELD OF THE INVENTION

The present invention is related to a suspension system, and in particular, to an adjustable spring assembly having a leaf spring attached to a frame through a piston-cylinder unit.

BACKGROUND OF THE INVENTION

Leaf springs are used in suspension systems for motor vehicles such as small utility vehicles, trucks, and the like. A pair of leaf springs can support a vehicle frame over an axle and absorb at least part of the vibrations experienced by the axle during traveling over rough rods. In addition, the leaf springs can provide a cost effective suspension for vehicles carrying heavy loads.

Leaf springs generally have a linear load deflection curve or spring rate and as such are not adjustable when the vehicle is subjected to different road conditions, cargo weights and the like. As such, a leaf spring suspension system can result in less than desired driver comfort when conditions such as road conditions and cargo weight fall outside of a range(s) used to "set up" the suspension system. Therefore, a suspension apparatus or system that uses leaf springs and affords adjustment of a leaf spring rate would be desirable.

SUMMARY OF THE INVENTION

The present invention provides a suspension device or system having a leaf spring and a piston-cylinder unit, the leaf spring having a first end that is movably attached to a frame through a the use of a slot and a second movably attached to the frame through a piston-cylinder unit that is pivotally attached to the frame. The piston-cylinder unit can have a frame end that is pivotally attached to the frame and a spring end pivotally attached to the first end of the leaf spring about a first pivot axis. In addition, the piston-cylinder unit can be adjustable using any adjustment mechanism known to those skilled in the art, for example a manual adjustment mechanism, a remote adjustment mechanism, and an automatic adjustment mechanism.

The leaf spring can be a secondary leaf spring and the suspension device can further include a primary leaf spring that has two spaced apart ends with both ends pivotally attached to the frame. The primary leaf spring can also be attached to the secondary leaf spring. In such instances, the primary leaf spring can be attached to an intermediate section of the secondary leaf spring that extends between the first end and second end thereof. In addition, the primary leaf spring can be attached to an axle with the primary leaf spring located and/or extending between the secondary leaf spring and the axle.

The present invention also includes a process for dampening leaf spring vibrations, the process including providing a frame and the suspension device described above. Thereafter, the suspension device can be subjected to a vibrational force such that the leaf spring vibrates and the leaf spring vibrations are dampened by expansion and contraction of the piston-cylinder unit. In the event that weight or cargo is placed onto the frame and/or conditions experienced by the suspension device are altered, the piston-cylinder unit can be adjusted using a manual adjustment mechanism, a remote adjustment mechanism, an automatic adjustment mechanism, and the like. As such, the piston-cylinder unit can have a first setting that provides the leaf spring with a first spring rate and a second setting that provides the leaf spring with a second spring rate. In this manner, the suspension device and/or the process afford for an adjustable leaf spring system that can provide improved rider comfort and/or performance of a motor vehicle.

BRIEF DESCRIPTION OF THE DRAWINGS

FIG. 1 is a prior art view of a leaf spring device for a motor vehicle;

FIG. 2 is an enlarged view of the leaf spring device shown in FIG. 1;

FIG. 3 is a schematic illustration of a suspension device according to an embodiment of the present invention;

DETAILED DESCRIPTION OF THE PRESENT INVENTION

Figure 4:
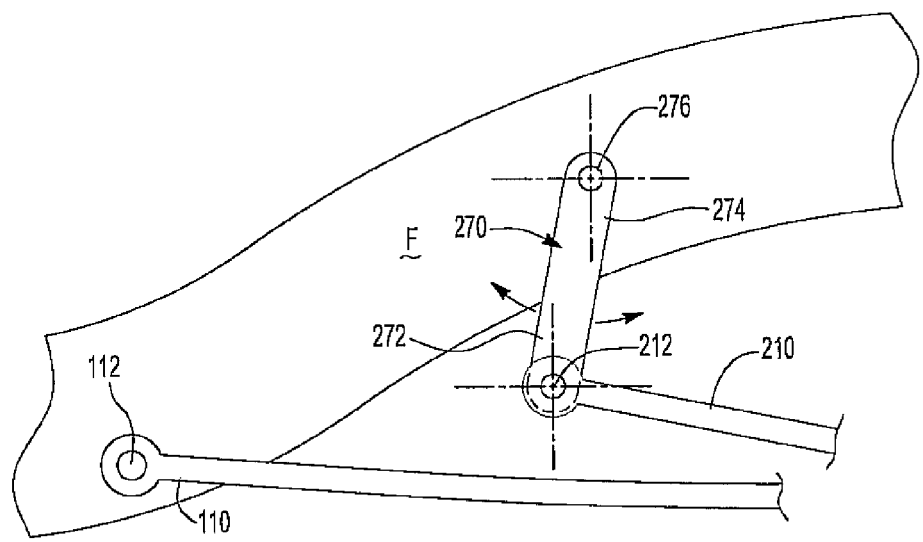
FIG. 4 is a schematic illustration of a suspension device according to another embodiment of the present invention.

The present invention provides a suspension device or system for a motor vehicle. As such, the present invention has utility as a component for a motor vehicle.

The suspension device has a leaf spring with one end attached to a frame about a pivot axis that is fixed relative to the frame and another end that is attached to the frame about a pivot axis that is movable relative to the frame. The pivot axis that is movable relative to the frame can be afforded by a piston-cylinder unit that has a frame end attached to the frame and a spring end attached to the spring leaf. The piston-cylinder unit can be any piston-cylinder unit known to those skilled in the art that can provide a dampening to vibrations, for example and for illustrative purposes only, pneumatic and/or hydraulic shock absorbers that have a cylinder with a sliding piston inside, the piston extending from the cylinder that is filled with a fluid. It is appreciated that the piston-cylinder unit can include cushions, springs, and the like. In addition, electromagnetic types of piston-cylinder units in which energy is dissipated through the use of an electromagnetic field are included.

The piston-cylinder unit can be adjusted using an adjustment mechanism such as a manual adjustment mechanism on the unit itself, a remote adjustment mechanism that is in communication with the piston-cylinder unit, and/or an automatic adjustment mechanism that uses a sensor to determine a load on the frame, a spring rate of the leaf spring, a combination thereof, and the like. In some instances, the leaf spring can be a secondary leaf spring and the spring apparatus can further include a primary leaf spring that has two spaced apart ends, both of the spaced apart ends being pivotally attached to the frame. In addition, the primary leaf spring can be attached to the secondary leaf spring. For purposes of the present invention, the term primary leaf spring refers to a leaf spring have the longest length of a set of leaf springs, the term secondary leaf spring refers to a leaf spring being shorter in length than the primary leaf spring, the term tertiary leaf spring refers to a leaf spring being shorter in length than the secondary leaf spring, and the like.

Turning now to FIGS. 1 and 2, schematic illustrations of a prior art leaf spring device are shown generally at reference numeral 10. In some instances, the leaf spring device 10 can be attached to a motor vehicle MV. In addition, the leaf spring device 10 can include a leaf spring 100 having a first end 110, a second end 120, and an intermediate section 115 extending between the first end 110 and second end 120. The first end 110 can be pivotally attached to a frame F about a pivot axis 112 and the second end 120 is attached to the frame F about a pivot axis 122. It is appreciated that such pivot axes 112 and 122 are fixed relative to the frame F. The leaf spring system 10 can also include another leaf spring 150 with the leaf spring 100 and the leaf spring 150 attached to an axle 300 using one or more U bolts 310, a fastening plate 320, and one or more threaded fastener components 312. For example and for illustrative purposes only, the U bolts 310 can have threaded ends 311 with nuts 312 threaded thereon.

When a load is placed on the frame F and/or the axle 300 is subjected to vibrations such as typically experienced during traveling along a road, the leaf spring 100 and the leaf spring 150 can provide dampening to vibrations experienced by the axle 300 and transmitted to the frame F. However, it is appreciated that the leaf spring 100 and the leaf spring 150 have a single spring rate during operation of the motor vehicle MV.

Looking now at FIG. 3, a suspension apparatus 20 can include a leaf spring 200 that has a first end 210 movably attached to the frame F, for example and illustrative purposes only, through a slot 232 and an axis 212. The slot 232 may or may not be part of a bracket 230 that is rigidly attached to the frame F and the axis 212, and any additional axes described herein, can be part of a pin, bolt, and the like used to attached one component to another component such that movement between the components can occur.

Figure 5:
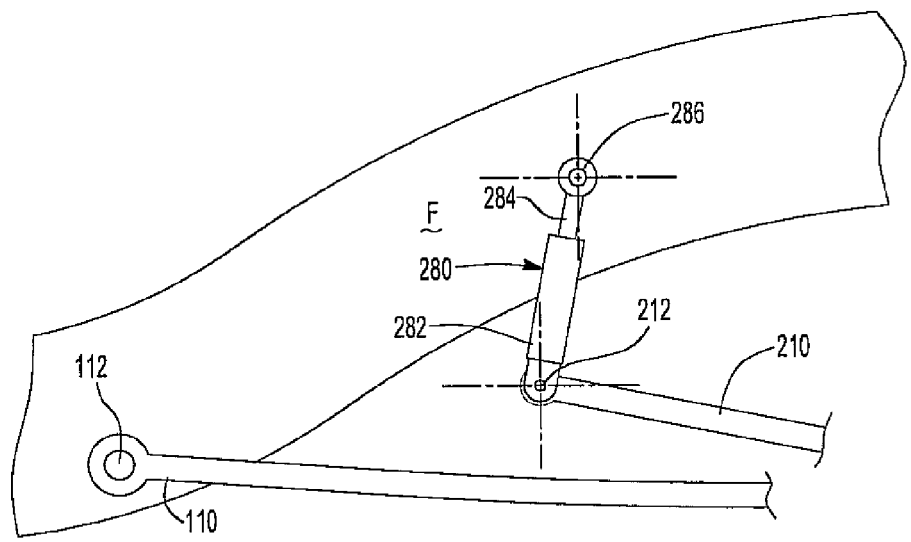
FIG. 5 is a schematic illustration of a suspension device according to an another embodiment of the present invention.

The first end 210 can also be movably attached to the frame F through a lever 270 as shown in FIG. 4. The lever 270 can have a spring end 272 pivotally attached to the first end 210 via axis 212 and a frame end 274 pivotally attached to the frame F via an axis 276. In the alternative, the first end 210 can be movably attached to the frame F through a piston-cylinder unit 280, e.g. a forward piston-cylinder unit, as shown in FIG. 5. The piston-cylinder unit 280 can have a cylinder portion or spring end 282 pivotally attached to the first end 210 via the axis 212 and a piston portion or frame end 284 pivotally attached to the frame F via an axis 286.

The leaf spring 200 also has a second end 220 movably attached to the frame F via a piston-cylinder unit 240, e.g. a rearward piston-cylinder unit. The piston-cylinder unit 240 can have a cylinder portion or spring end 242 pivotally attached to the second end 220 via a first axis 243 and a piston or frame end 244 pivotally attached the frame F via a second axis 245. As is known to those skilled in the art, the piston-cylinder unit 240, as well as the piston-cylinder unit 280, can expand and contract and thereby dampen vibrations experienced by the leaf spring 200, change a spring rate of the leaf spring 200, and the like. In addition, it is appreciated that the piston-cylinder unit 240, as well as the piston-cylinder unit 280, can be attached to the spring 200 and frame F in an upside down manner, i.e. the cylinder end or portion can be attached to the frame and piston end or portion can be attached to the spring.

The piston-cylinder unit 240 can be adjusted, for example through the use of manual adjustment settings 246, a remote switch/dial 250, and/or through the use of a sensor 260 that can sense a load applied to the frame F, a spring rate experienced by the leaf spring 200, and/or combinations thereof. The sensor 260 can communicate the load and/or spring rate to a controller 262 that can then subsequently adjust the dampening characteristics of the piston/cylinder unit 240. It is appreciated that the piston-cylinder unit 240 and/or sensor 260 can be in communication with the switch/dial 250 and/or controller 262 via electrical wiring 248, via wireless communication, combinations thereof, etc. In addition, the piston-cylinder unit 240 can have a first setting, a second setting, etc., with the leaf spring 200 having a first spring rate when the piston-cylinder unit 240 is set at the first setting, the leaf spring 200 having a second spring rate when the piston-cylinder unit 240 is set at the second setting, etc. In this manner the leaf spring 200 can have a plurality of spring rates.

In some instances, the leaf spring 200 and piston/cylinder unit 240 can be combined with another leaf spring that is attached to the frame F in a prior art known manner. For example, the suspension apparatus 20 can include the leaf spring 100 as described in FIGS. 1 and 2. As such, the leaf spring 100 would be a primary leaf spring and the leaf spring 200 would be a secondary leaf spring. In addition, it is appreciated that a leaf spring attached to a frame via a movable pivot axis could be a primary leaf spring used in combination with at least a secondary leaf spring.

The leaf spring 100 and leaf spring 200 can be attached to the axle 300 using any attachment mechanism, device, etc., known to one skilled in the art to attach one or more leaf springs to an axle. For example, the leaf springs 100 and 200 can be attached to the axle 300 using at least one U bolt 310, fastening plate 320, and threaded components 312 as shown in the figure.

Although not shown in the figures, the leaf spring 100 can also be attached to the frame F in a like manner as the leaf spring 200. In addition, it is appreciated that the first end 210 and the second end 220 can be attached to the frame F in reverse order, i.e. the second end 220 can be attached to the frame F in a like manner as the first end 210 described above, and the first end 210 can be attached to the frame F as the second end 220 described above.

A process for dampening of leaf spring vibrations is also provided, the process including a frame F, a leaf spring 200, and a piston-cylinder unit 240. The process includes movably attaching the first end 210 of the leaf spring 200 to the frame F about the pivot axis 212 as described above. In addition, a frame end 244 of the piston-cylinder unit 240 is pivotally attached to the frame F and the second end 220 of the leaf spring 200 is pivotally attached to a spring end 242 of the piston-cylinder unit 240 about the second pivot axis 243. It is appreciated that the spring end 242 of the piston-cylinder unit 240 is spaced apart from the frame end 244 and the second pivot axis 243 is movable relative to the frame F. The process further includes subjecting the leaf spring 200 to a vibrational force such that the leaf spring vibrates and the leaf spring vibrations are dampened by expansion and contraction of the piston-cylinder unit 242.

The piston-cylinder unit 240 is adjusted depending upon a load placed on the frame F and/or severity of vibrations provided to the leaf spring 200. For example, the piston-cylinder unit 240 can have a first setting that provides the leaf spring 200 with a first spring rate and a second setting that provides the leaf spring 200 with a second spring rate. As stated above, the leaf spring 200 can be used in combination with one or more leaf springs that may or may not have two ends that are attached to the frame F about fixed pivotal axes.

The invention is not restricted to the illustrative examples or embodiments described above. The examples or embodiments are not intended as limitations on the scope of the invention. Methods, processes, apparatus, and the like described herein are exemplary and not intended as limitations on the scope of the invention. Changes therein and other uses will occur to those skilled in the art. The scope of the invention is defined by the scope of the claims.

I claim:

1. A suspension apparatus comprising:
   a frame;
   a primary leaf spring having two spaced apart ends both pivotally attached to said frame;

a secondary leaf spring and a piston-cylinder unit, said secondary leaf spring having a first end movably attached to said frame and a second end pivotally attached to said piston-cylinder unit, said piston-cylinder unit pivotally attached to said frame;

said primary leaf spring attached to said secondary leaf spring.

2. The suspension apparatus of claim 1, wherein said first end of said secondary leaf spring is movably attached to said frame through a slot.

3. The suspension apparatus of claim 1, wherein said first end of said secondary leaf spring is movably attached to said frame through a lever, said lever pivotally attached to said frame.

4. The suspension apparatus of claim 1, wherein said first end of said secondary leaf spring is movably attached to said frame through another piston-cylinder unit.

5. The suspension apparatus of claim 1, wherein said piston-cylinder unit has a frame end pivotally attached to said frame and a spring end pivotally attached to said second end of said secondary leaf spring.

6. The suspension apparatus of claim 1, wherein said piston-cylinder unit is adjustable using an adjustment mechanism selected from a group consisting of a manual adjustment mechanism, a remote adjustment mechanism and an automatic adjustment mechanism.

7. The suspension apparatus of claim 6, wherein said adjustment mechanism has a first setting and a second setting, said secondary leaf spring having a first spring rate when said adjustment mechanism is set on said first setting and a second spring rate when said adjustment mechanism is set on said second setting.

8. The suspension apparatus of claim 1, wherein said primary leaf spring is attached to an intermediate section of said secondary leaf spring that extends between said first end and said second end.

9. The suspension apparatus of claim 8, further comprising an axle attached to said primary leaf spring between said two spaced apart ends.

10. The suspension apparatus of claim 9, wherein said primary leaf spring extends between said secondary leaf spring and said axle.

11. A suspension system for a motor vehicle comprising:

a frame;

a primary leaf spring having two ends spaced apart from each other and both pivotally attached to said frame about a pair of pivot axes fixed relative to said frame;

a secondary leaf spring and a piston-cylinder unit, said secondary leaf spring having a first end movably attached to said frame through a first pivot axis and a second end pivotally attached to said piston-cylinder unit through a second pivot axis.

12. The suspension apparatus of claim 11, wherein said first end of said secondary leaf spring is movably attached to said frame through a slot.

13. The suspension apparatus of claim 11, wherein said first end of said secondary leaf spring is movably attached to said frame through a lever, said lever pivotally attached to said frame.

14. The suspension apparatus of claim 11, wherein said first end of said secondary leaf spring is movably attached to said frame through another piston-cylinder unit.

15. The suspension system of claim 11, wherein said piston-cylinder unit is adjustable using an adjustment mechanism selected from a group consisting of a manual adjustment mechanism, a remote adjustment mechanism and an automatic adjustment mechanism.

16. The suspension system of claim 11, wherein said second pivot axis is movable relative to said frame by compression and expansion of said piston-cylinder unit.

17. The suspension system of claim 16, wherein said piston-cylinder unit has a frame end pivotally attached to said frame and a spaced apart spring end pivotally attached to said second end of said secondary leaf spring.

18. The suspension system of claim 11, further comprising an axle attached to said primary leaf spring.

19. The suspension system of claim 18, wherein said primary leaf spring extends between said secondary leaf spring and said axle.

* * * * *